United States Patent
Moore et al.

(10) Patent No.: US 7,969,689 B2
(45) Date of Patent: Jun. 28, 2011

(54) SPACER KEYS WITH PIVOTING SUPPORTS

(75) Inventors: Brendan J. Moore, Shakopee, MN (US); Jeffery B. Carlson, Apple Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 959 days.

(21) Appl. No.: 11/838,478

(22) Filed: Aug. 14, 2007

(65) Prior Publication Data
US 2009/0046389 A1 Feb. 19, 2009

(51) Int. Cl.
- G11B 5/48 (2006.01)
- G11B 21/16 (2006.01)
- G11B 21/02 (2006.01)
- B25J 15/08 (2006.01)

(52) U.S. Cl. .............. 360/245.2; 360/244.6; 360/266.1; 360/137; 29/603.03; 29/715; 29/737; 29/757

(58) Field of Classification Search .............. 360/97.01, 360/244.5, 244.6, 245.2, 266.1, 137; 29/603.03, 29/603.04, 737, 729, 711, 715, 788, 796, 29/523, 283.5, 757
See application file for complete search history.

(56) References Cited

U.S. PATENT DOCUMENTS

| | | | |
|---|---|---|---|
| 5,012,367 A | 4/1991 | Toensing |
| 5,027,239 A | 6/1991 | Hagen |
| 5,097,584 A | 3/1992 | Cain et al. |
| 5,142,770 A | 9/1992 | Cain et al. |
| 5,198,945 A | 3/1993 | Blaeser et al. |
| 5,262,911 A | 11/1993 | Cain et al. |
| 5,291,359 A | 3/1994 | Wolter |
| 5,313,355 A | 5/1994 | Hagen |
| 5,404,636 A | 4/1995 | Stefansky et al. |
| 5,471,734 A | 12/1995 | Hatch et al. |
| 5,487,216 A | 1/1996 | Demarest et al. |
| 5,495,375 A | 2/1996 | Baasch et al. |
| 5,526,205 A | 6/1996 | Aoyagi et al. |
| 5,535,074 A | 7/1996 | Leung |
| 5,559,651 A | 9/1996 | Grantz et al. |
| 5,570,261 A | 10/1996 | Frater et al. |
| 5,621,590 A | 4/1997 | Pace et al. |
| 5,650,896 A | 7/1997 | Viskochil |
| 5,717,545 A | 2/1998 | Brooks, Jr. et al. |
| 5,748,412 A | 5/1998 | Murdock et al. |
| 5,862,019 A | 1/1999 | Larson |

(Continued)

FOREIGN PATENT DOCUMENTS
JP 2004034205 A * 2/2004

(Continued)

Primary Examiner — William J Klimowicz
(74) Attorney, Agent, or Firm — McCarthy Law Group

(57) ABSTRACT

An apparatus for attaching one or more HGAs to an actuator assembly including one or more actuator arms comprises a set of pivoting supports corresponding to the one or more HGAs and mechanisms that pivot each of the pivoting supports between open positions and closed positions. For each of the set of pivoting supports, in the open position, a gap adjacent to the pivoting support is sufficiently large to receive both a mounting platform of one of the actuator arms and a baseplate of one of the HGAs positioned in alignment with the mounting platform of the one of the actuator arms, and, for each of the set of pivoting supports, in the closed position, the gap is sufficiently small to constrain the baseplate of the one of the HGAs against the mounting platform of the one of the actuator arms.

16 Claims, 9 Drawing Sheets

U.S. PATENT DOCUMENTS

| | | | |
|---|---|---|---|
| 5,877,919 A | 3/1999 | Foisy et al. | |
| 5,896,646 A | 4/1999 | Boutaghou et al. | |
| 5,936,803 A | 8/1999 | Berding | |
| 5,936,805 A | 8/1999 | Imaino | |
| 6,085,410 A * | 7/2000 | Toensing et al. | 29/758 |
| 6,128,164 A | 10/2000 | Kant et al. | |
| 6,141,868 A * | 11/2000 | Schmidt et al. | 29/757 |
| 6,244,087 B1 | 6/2001 | Blaimschein et al. | |
| 6,295,723 B1 * | 10/2001 | Coon | 29/760 |
| 6,308,546 B1 | 10/2001 | Blaimschein et al. | |
| 6,389,684 B1 * | 5/2002 | Toensing et al. | 29/757 |
| 6,631,553 B1 * | 10/2003 | Schmidt et al. | 29/757 |
| 6,704,995 B2 * | 3/2004 | Toensing et al. | 29/603.03 |
| 6,765,764 B1 | 7/2004 | Misso et al. | |
| 6,862,802 B2 * | 3/2005 | Cruz et al. | 29/737 |
| 6,931,899 B2 | 8/2005 | Goff et al. | |
| 6,993,953 B2 | 2/2006 | Stupecky | |
| 7,010,953 B2 | 3/2006 | Stupecky | |
| 7,024,909 B2 | 4/2006 | Cobzaru et al. | |
| 7,140,219 B2 | 11/2006 | Stecko | |
| 7,193,819 B1 * | 3/2007 | Chen et al. | 360/265.7 |
| 2003/0115741 A1 * | 6/2003 | Toensing et al. | 29/603.03 |
| 2003/0154595 A1 * | 8/2003 | Cruz et al. | 29/737 |
| 2007/0163105 A1 * | 7/2007 | Son et al. | 29/737 |

FOREIGN PATENT DOCUMENTS

WO    WO 2007116569 A1 * 10/2007

* cited by examiner

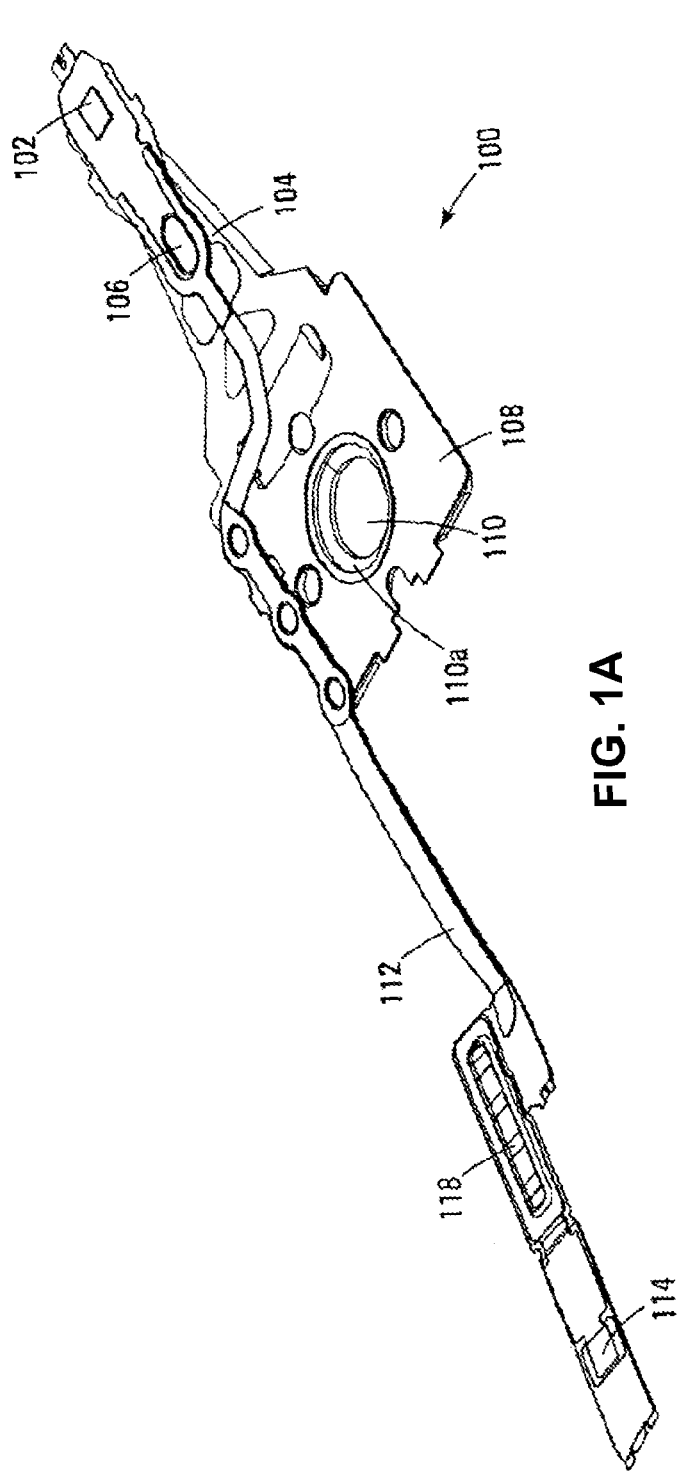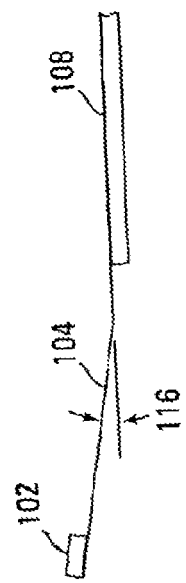

SPACER KEYS WITH PIVOTING SUPPORTS

BACKGROUND

A disc drive may include one or more data storage discs in a stack. Each data storage surface of a disc in the disc drive has its own associated head gimbal assembly (HGA) used for reading and writing information thereon. Each HGA is attached to an actuator arm which positions the HGA to located data tracks on the disc surface. In a disc drive having more than one disc, an actuator arm located between two discs may carry two HGAs: one for each adjacent disc. An actuator assembly of a disc drive generally includes as many actuator arms as necessary to physically access each data storage surface of the discs in the disc drive.

HGAs are generally connected to actuator arms using a mounting method known as "swaging." In swaging, a hole in a first piece, e.g., an actuator arm, is aligned with a similar hole which extends from a second piece, e.g., an HGA. The coincident hole which extends from the second piece is smaller than the hole in the first piece. For example, the coincident hole may be formed from a hollow tube. A rounded object, e.g., a ball or needle, is forced through the smaller hole to expand the material surrounding the smaller hole into the larger hole and lock the two pieces together.

Specially configured tooling is typically used for the swaging process to install HGAs onto actuator arms. To support an HGA and corresponding actuator arm during a swaging process, a support element (spacer key) is wedged against a baseplate of an HGA after the HGA is properly aligned with the actuator arm. This holds the HGA in place by pinching the baseplate of the HGA against the actuator arm during the swaging process.

SUMMARY

An apparatus for attaching one or more HGAs to an actuator assembly including one or more actuator arms comprises a set of pivoting supports corresponding to the one or more HGAs and mechanisms that pivot each of the pivoting supports between open positions and closed positions. For each of the set of pivoting supports, in the open position, a gap adjacent to the pivoting support is sufficiently large to receive both a mounting platform of one of the actuator arms and a baseplate of one of the HGAs positioned in alignment with the mounting platform of the one of the actuator arms, and, for each of the set of pivoting supports, in the closed position, the gap is sufficiently small to constrain the baseplate of the one of the HGAs against the mounting platform of the one of the actuator arms.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 1A-1B illustrate an exemplary head gimbal assembly (HGA) that can be mounted to an actuator arm using a spacer key assembly including one or more spacer keys with pivoting supports.

DETAILED DESCRIPTION

Figure 2:
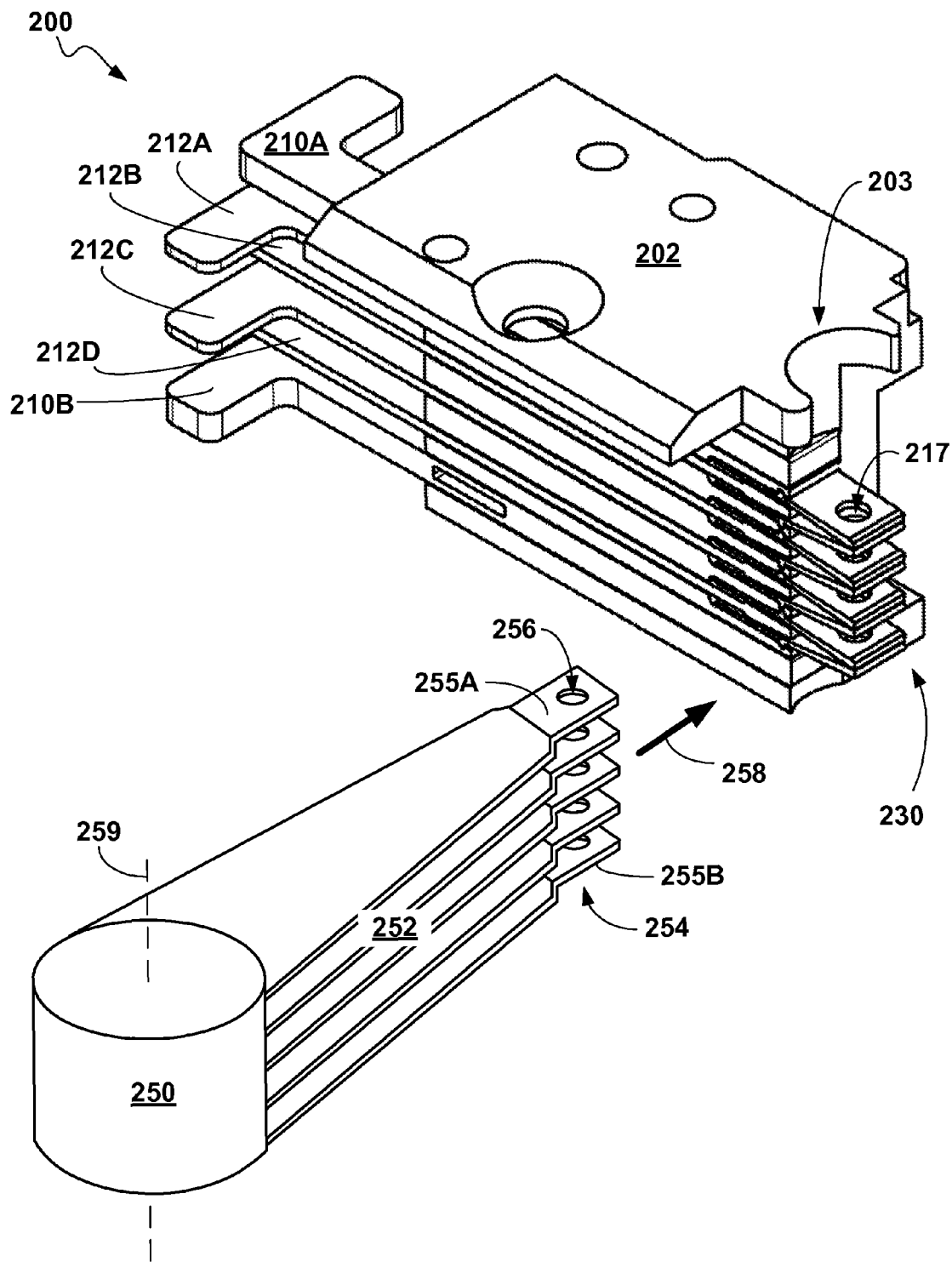
FIG. 2 illustrates an actuator arm in proximity to a spacer key assembly including spacer keys with pivoting supports.

FIGS. 1A-1B illustrate head gimbal assembly (HGA) 100. HGA 100 can be mounted to an actuator arm by a swaging process using a spacer key assembly including one or more spacer keys with pivoting supports. As shown in FIG. 1A, the basic components of HGA 100 include head 102, load beam 104, baseplate 108, boss hole 110 with angled surface 110a, and flex circuit 112 with flex circuit pads 118 and shunt tab 114. Baseplate 108 includes tooling hole 106, which is used for aligning HGA 100, e.g., during testing of HGA 100.

Head 102 contains transducers for reading and writing data to a data storage surface of a data storage disc. In an assembled disc drive, head 102 flies above the surface of a disc while load beam 104 provides the spring force to hold head 102 adjacent to the disc during operation of the disc drive. Load beam 104 is a thin, metal structure that has a bend; the angle of the bend with respect to the base plate 108 is the free state angle 116 (FIG. 1B). While embodiments are describer with respect to HGA 100, the specific configuration of HGA 100 is merely exemplary. HGAs having alternative configurations may also be used.

A swaging process is used to attach HGA 100 to a disc drive actuator arm, e.g., one of actuator arms 252 (FIG. 2). During a swaging process, a ball, needle or other hard object is forced through boss hole 110 and a corresponding mounting hole on a baseplate mounting surface of an actuator arm in alignment with boss hole 110. The swaging process deforms the material forming angled surface 110a against the interior surface of the corresponding mounting hole on a baseplate mounting surface to securely attach baseplate 108 to the baseplate mounting surface of the actuator arm. After swaging, the inner wall of boss hole 110 grips the mounting hole on the baseplate mounting surface and thereby secure the baseplate 108 to the actuator arm.

A swaging process may include multiple iterations in which differently sized balls, needles or other objects are pressed through boss hole 110 and the corresponding mounting hole on the baseplate mounting surface. Differently sized balls, needles or other objects may be pressed through boss hole 110 and the corresponding mounting hole on the baseplate mounting surface in one or two directions in order to securely attach HGA 100 to an actuator arm.

As discussed with respect to FIGS. 2-8, a spacer key assembly including one or more spacer keys with pivoting supports is used to hold baseplate 108 of HGA 100 against the baseplate mounting surface of the actuator arm during the swaging process.

FIG. 2 illustrates actuator assembly 250 in proximity to spacer key assembly 200, which includes spacer keys 212A-212D (spacer keys 212). Each of spacer keys 212 is operable to actuate two pivoting supports 230 in order to constrain a baseplate of an HGA, e.g., HGA 100 (FIG. 1), tightly against one of mounting platforms 254 on one of actuator arms 252, e.g., to facilitate a swaging process. Spacer key assembly 200 also includes outer keys 210A and 210B (outer keys 210), which are not associated with pivoting supports.

Actuator assembly 250 includes five actuator arms 252. Other actuator assemblies suitable for use with the current invention may include more actuator arms or as few as a single actuator arm. In an assembled disc drive, actuator assembly 250 is operable to pivot about axis 259 to locate heads on HGAs mounted to mounting platforms 254 on data surfaces of a data disc in a disc drive. Each of mounting platforms 254 include two mounting surfaces: an upper mounting surface and a lower mounting surface. The terms upper and lower are relative and are not intended to indicate a specific orientation of actuator assembly 250 in an assembled disc drive. Because each mounting platform 254 includes two mounting surfaces, each mounting platform 254 can hold up to two HGAs. In general, each mounting surface of mounting platforms 254 except for outer mounting surfaces 255A and 255B (outer mounting surfaces 255) is used to hold an HGA in an assembled disc drive. For example, actuator arms 252 may be used to hold a total of eight HGAs. This relationship between a number of HGAs in the actuator assembly and a required number of actuator arms of an actuator assembly and can be represented as:

$$\frac{HGAs + 2}{2} = \text{Actuator\_Arms} \quad \text{(Equation 1)}$$

One reason that outer mounting surfaces 255 are not generally used to hold HGAs is that in a disc drive including a stack of two-sided data storage discs, outer mounting surfaces 255 will not be adjacent to a data storage disc. For example, a disc drive including actuator assembly 250 may have exactly four data storage discs in a stack. In some embodiments, outer mounting surfaces 255 may be used to hold mass dampers having bending modes similar to the bending modes of the HGAs attached to the other mounting surfaces of actuator assembly 250. Mass dampers have been shown to reduce the occurrence and severity of head-disc contact from a shock event to a disc drive compared to actuator assemblies having some unpopulated mounting surfaces. In such embodiments, each of outer keys 210 may be replaced with a spacer key corresponding to a single pivoting support.

In order to facilitate a swaging process to attach HGAs to actuator assembly 250, actuator assembly 250 must first be positioned in alignment with spacer key assembly 200. Actuator assembly 250 may be placed in alignment with spacer key assembly 200 by moving actuator assembly 250 in the general direction of arrow 258. When actuator assembly 250 is in alignment with spacer key assembly 200, mounting holes 256 of mounting platforms 254 are coincident with apertures 217 of pivoting supports 230.

Figure 3A:
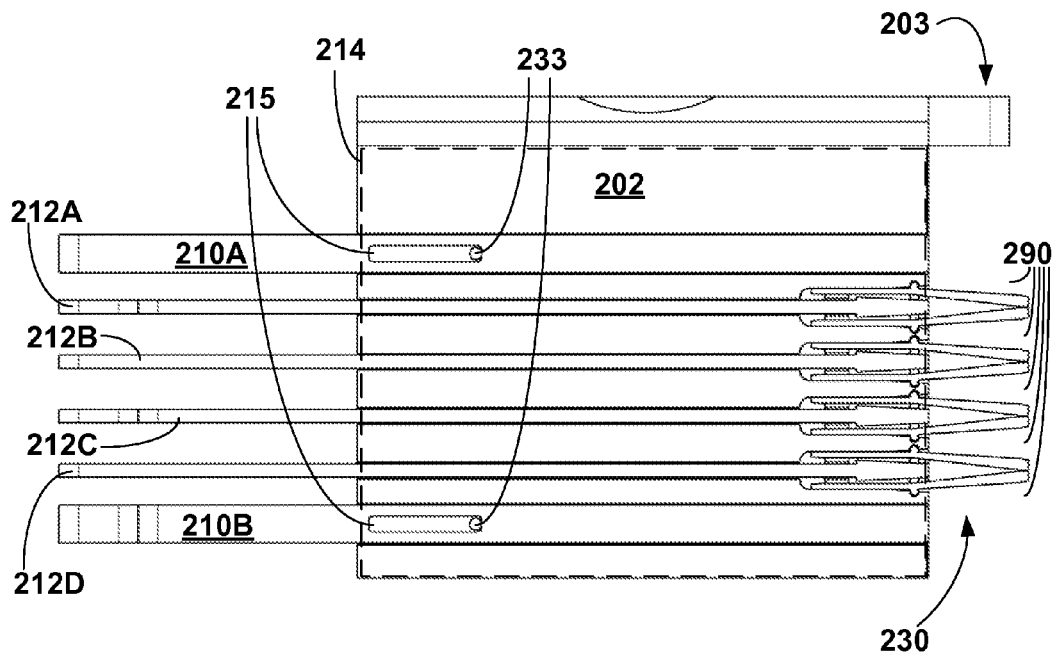
FIGS. 3A-3B show the spacer keys with pivoting supports of the spacer key assembly of FIG. 1 in open and closed positions.

Further details regarding spacer key assembly 200 are described with respect to FIGS. 3A-7. FIGS. 3A-3B are side-view illustrations of spacer key assembly 200 and show pivoting supports 230 in open (FIG. 3A) and closed (FIG. 3B) positions, whereas FIGS. 4-7 illustrate individual components of spacer key assembly 200.

As discussed previously, the desired functionality of spacer key assembly 200 is to constrain baseplates of HGAs against the mounting platforms of actuator arms to, e.g., facilitate a swaging process to attach the HGAs to the actuator arms. The movement of pivoting supports 230 between an open position (FIG. 3A) and a closed position (FIG. 3B) accomplishes this task. Actuatable spacer keys 212 function as mechanisms operable to pivot pivoting supports 230 between the open position and the closed positions.

Spacer key assembly 200 constrains baseplates of HGAs against the mounting platforms with enough force to maintain alignment between an HGA and a mounting platform during a swaging process.

Each of actuatable spacer keys 212 functions in a substantially similar manner. Sliding an actuatable spacer key 212 towards the corresponding pivoting supports 230 causes the distal end of the actuatable spacer key 212, wedge 270 (FIG. 7), to act on the two corresponding pivoting supports 230 to move the pivoting supports 230 to their closed positions. Conversely, sliding the actuatable spacer key 212 away from the corresponding pivoting supports 230 causes the distal end of the actuatable spacer key 212, wedge 270, to act on the pivoting supports 230 to move the pivoting support 230 to their open positions (FIG. 3A).

Outer keys 210 function to prevent an actuator arm from flexing in order to constrain baseplates of HGAs tightly against the mounting platforms of actuator arms. Pivoting supports 230 combine with outer keys 210 to form gaps 290A-290E (gaps 290). As shown in FIG. 3A, when pivoting supports 230 are in their open positions, gaps 290 are large enough to receive both a mounting platform of an actuator arm and a baseplate of an HGA positioned in alignment with the mounting platform of the actuator arm. When pivoting supports 230 are in open positions, outer keys 210 and actuatable spacer keys 212 are in fully retracted positions (FIG. 3A).

Figure 3B:
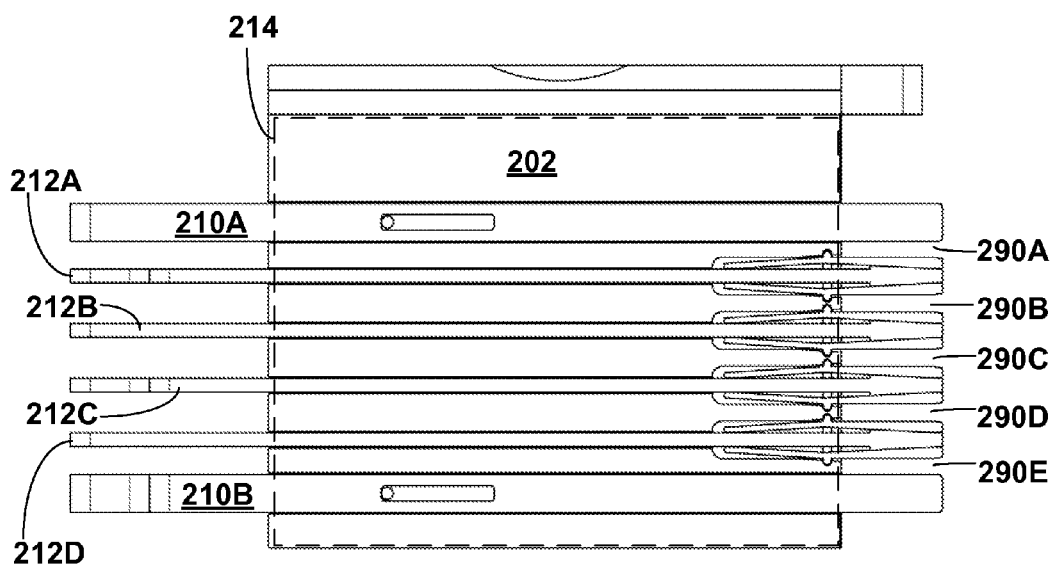

In FIG. 3B, each of pivoting supports 230 is in a closed position, and outer keys 210 and actuatable spacer keys 212 are in fully extended positions. When each of pivoting supports 230 is in a closed position gaps 290 are sized to constrain the baseplate of an HGA tightly against the mounting platform of an actuator arm. More specifically, gaps 290A and 290E are sized to constrain a single baseplate of an HGA tightly against a single mounting platform, whereas gaps 290B-290D are sized to constrain two baseplates tightly against a single mounting platform—one HGA on either side of the actuator arm mounting platform.

Figure 4:
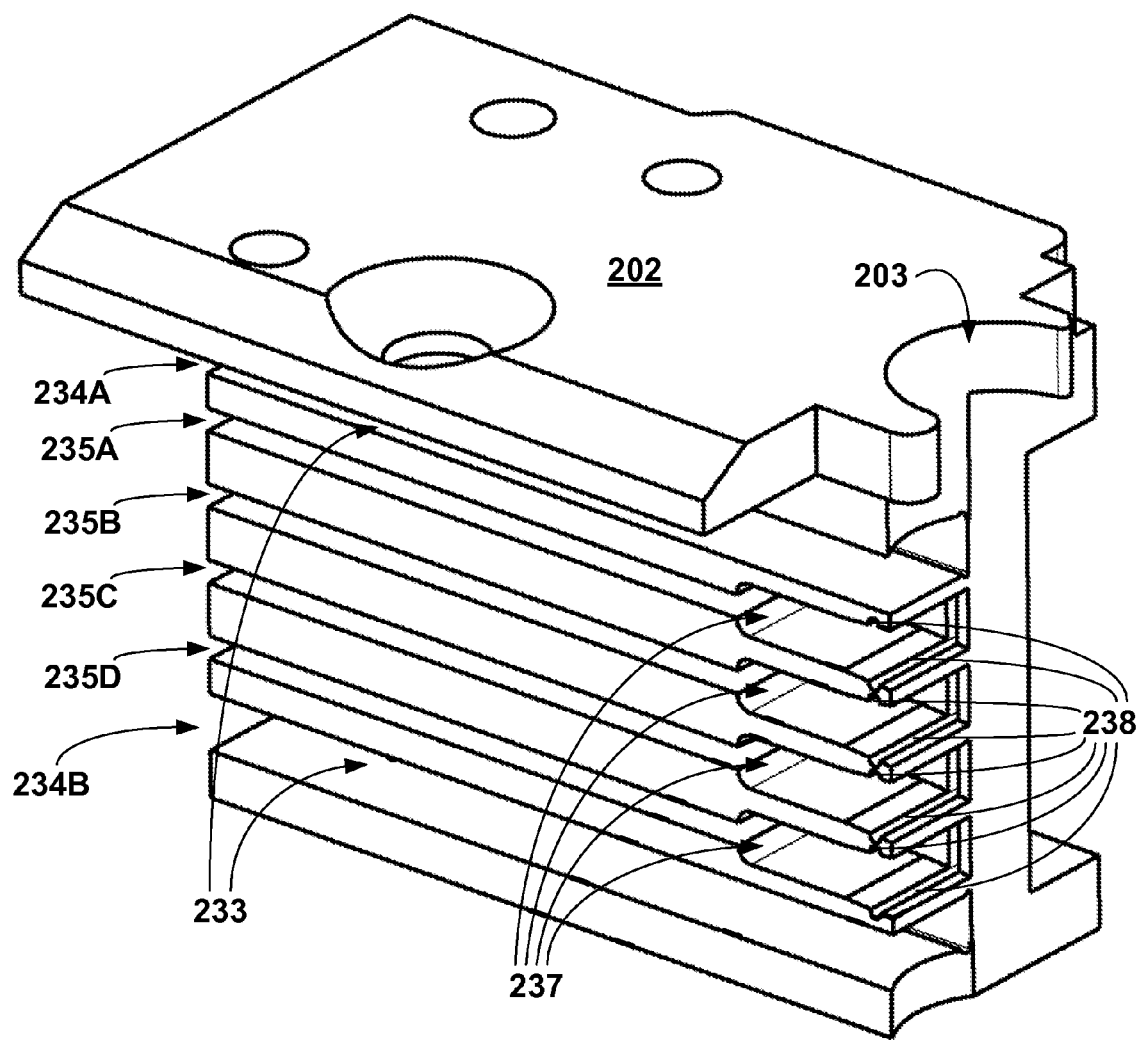
FIGS. 4-7 illustrate components of the spacer key assembly of FIG. 2.
Figure 6:
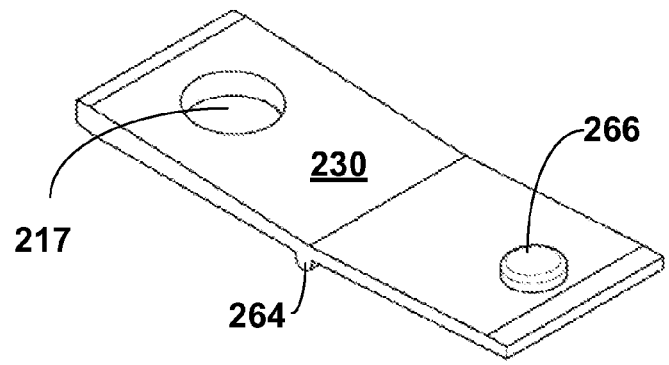
Figure 7:
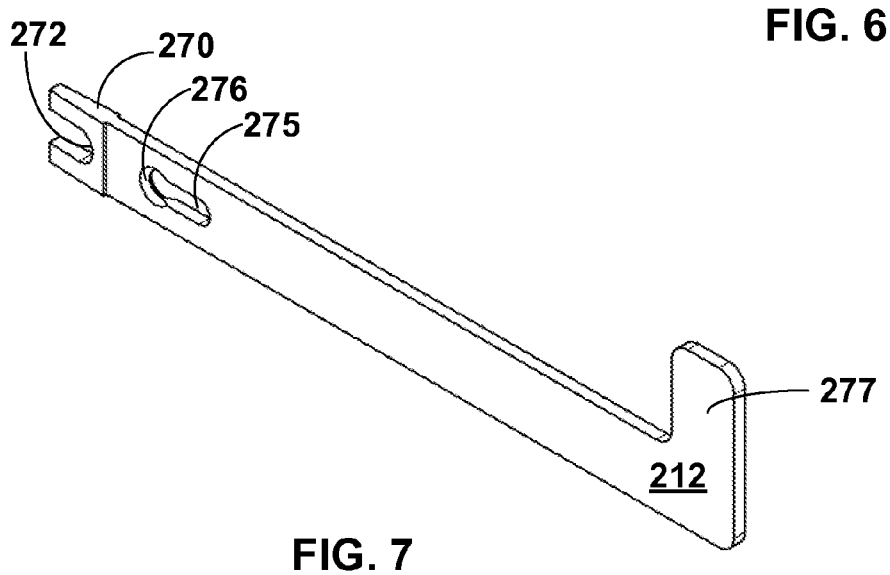

FIG. 4 illustrates body portion 202, which includes interior slots 235A-235D (interior slots 235) that hold actuatable spacer keys 212 (FIG. 7). Each of interior slots 235 also holds two of pivoting supports 230 (FIG. 6). Each of pivoting supports 230 include a raised ridge 264 that mates with one of notches 238 in interior slots 235A-235D (interior slots 235). Pivoting supports 230 pivot about notches 238. Body portion 202 also includes outer slots 234A-234B (outer slots 234) for outer keys 210. Outer keys 210 function to brace unpopulated sides of actuator arms 252, i.e., outer mounting surfaces 255. Body portion 202 also includes guide 203, which allows a swaging device to access HGA baseplates constrained to mounting platforms 254 in spacer key assembly 200.

Figure 5:
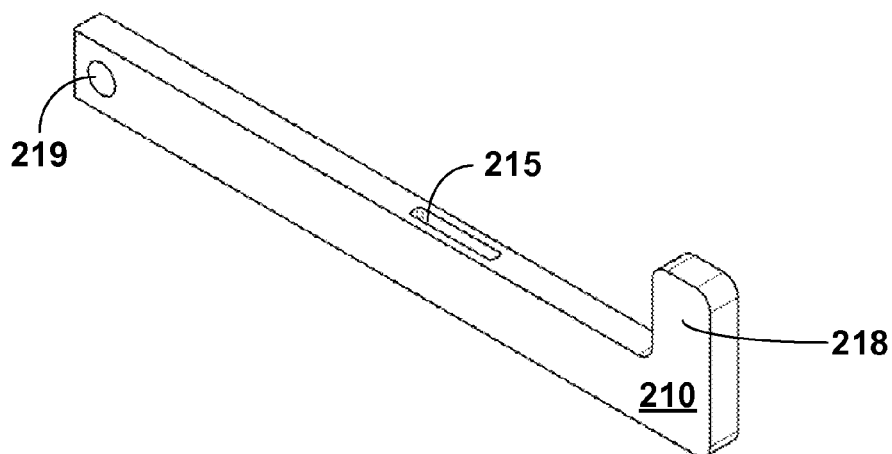

FIG. 5 illustrates one of outer keys 210. Outer keys 210 are slidable within outer slots 234 in body portion 202 (FIG. 4). An outer key 210 includes grip 218, which provides a larger area for manual actuation of the outer key 210. Slot 215 interacts with a peg 233 of body portion 202 (FIG. 3) to limit the motion of outer key 210 within an outer slot 234. As allowed by a peg 233, when an outer key 210 is in a fully extended position (FIG. 3B), aperture 219 is in alignment with mounting holes 256 of mounting platforms 254 and apertures 217 of pivoting supports 230. In a retracted position, outer key 210 allows access to outer mounting surfaces 255 of actuator assembly 250.

FIG. 6 illustrates one of pivoting supports 230. As shown in FIGS. 3-4, two of pivoting supports 230 fit at least partially within each of interior slots 235. A pivoting support 230 includes a raised ridge 264 that mates with one of notches 238 in interior slots 235A-235D (interior slots 235) to form a pivot point for the pivoting support 230. Pivoting supports 230 are acted on by actuatable spacer keys 212 to move between closed and open positions. In an open position, a pivoting support 230 is adjacent to a gap large enough to receive both a mounting platform of an actuator arm and a baseplate of the HGA positioned in alignment with the mounting platform of the actuator arm, e.g., as shown in FIG. 3A. The gap may be formed between two of pivoting supports 230 or between a pivoting support 230 and an outer key 210. In a closed position, a pivoting supports 230 constrains the baseplate of an HGA tightly against a mounting platform of an actuator arm because the width of the gap is reduced, e.g., as shown in FIG. 3B.

FIG. 7 illustrates one of actuatable spacer keys 212. Actuatable spacer keys 212 are slidable within interior slots 235 in body portion 202 (FIG. 4). An actuatable spacer key 212 includes grip 277, which provides a larger area for manual actuation of the actuatable spacer key 212. The distal end of an actuatable spacer key 212 forms a wedge 270, which contacts two pivoting supports 230 to pivot the two pivoting supports 230 between open and closed positions as the actuatable spacer key 212 slides from a fully retracted position (FIG. 3A) to a fully extended position (FIG. 3B). The motion of an actuatable spacer key 212 is limited by extrusions 266 on pivoting supports 230.

In the fully extended position, further extension of an actuatable spacer key 212 is limited by extrusions 266, which mate with slot 275. Slot 275 includes beveled edges 276 on its distal end to allow extrusions 266 to enter slot 275 with some degree of misalignment. In the fully retracted position, further retraction of the actuatable spacer key 212 is limited by contact between extrusions 266 of the corresponding pivoting supports 230 and the flat side of wedge 270 on actuatable spacer key 212. U-shaped cutout 272 in wedge 270 is configured to allow access to a mounting platform of an actuator arm and a baseplate of the HGA positioned in alignment with the mounting platform of the actuator arm when held by spacer key assembly 200 for a swaging process.

Spacer key assembly 200 also includes cover 214, which is represented as a dotted line in FIGS. 3A-3B. To assemble spacer key assembly 200, the movable components of spacer key assembly 200 (outer keys 210, actuatable spacer keys 212 and pivoting supports 230) are first properly positioned in body portion 202. Then, cover 214 is attached to body portion 202 to hold the movable components in place. For example, cover 214 may be attached to body portion 202 with screws or by other means. In some embodiments, cover 214 may be readily removable, e.g., to allow maintenance or replacement a damaged component of spacer key assembly 200.

Spacer key assembly 200 may or may not include a lubricant. Different design choices can reduce or eliminate the need for lubrication between moving components of spacer key assembly 200. For example, the components of space key assembly 200 may be made of a hard, polished stainless steel to reduce friction, e.g., 400 series stainless steel. As another example, spacer key assembly 200 may be designed with float between the movable components. For example, interior slots 235 may be designed to provide a float of ±0.002" for actuatable spacer keys 212; likewise, outer slots 234 may be designed to provide a float of ±0.002" for outer keys 210. A similar float may be designed between interior slots 235, actuatable spacer keys 212 and pivoting supports 230.

Even though the interaction of the movable components of spacer key assembly 200 can be designed with float, gaps 290 may still have high precision because the effect of float between interior slots 235, actuatable spacer keys 212 and pivoting supports 230 can be calculated to accurately determine the dimensions gaps 290 when pivoting supports 230 are in closed positions.

Figure 8:
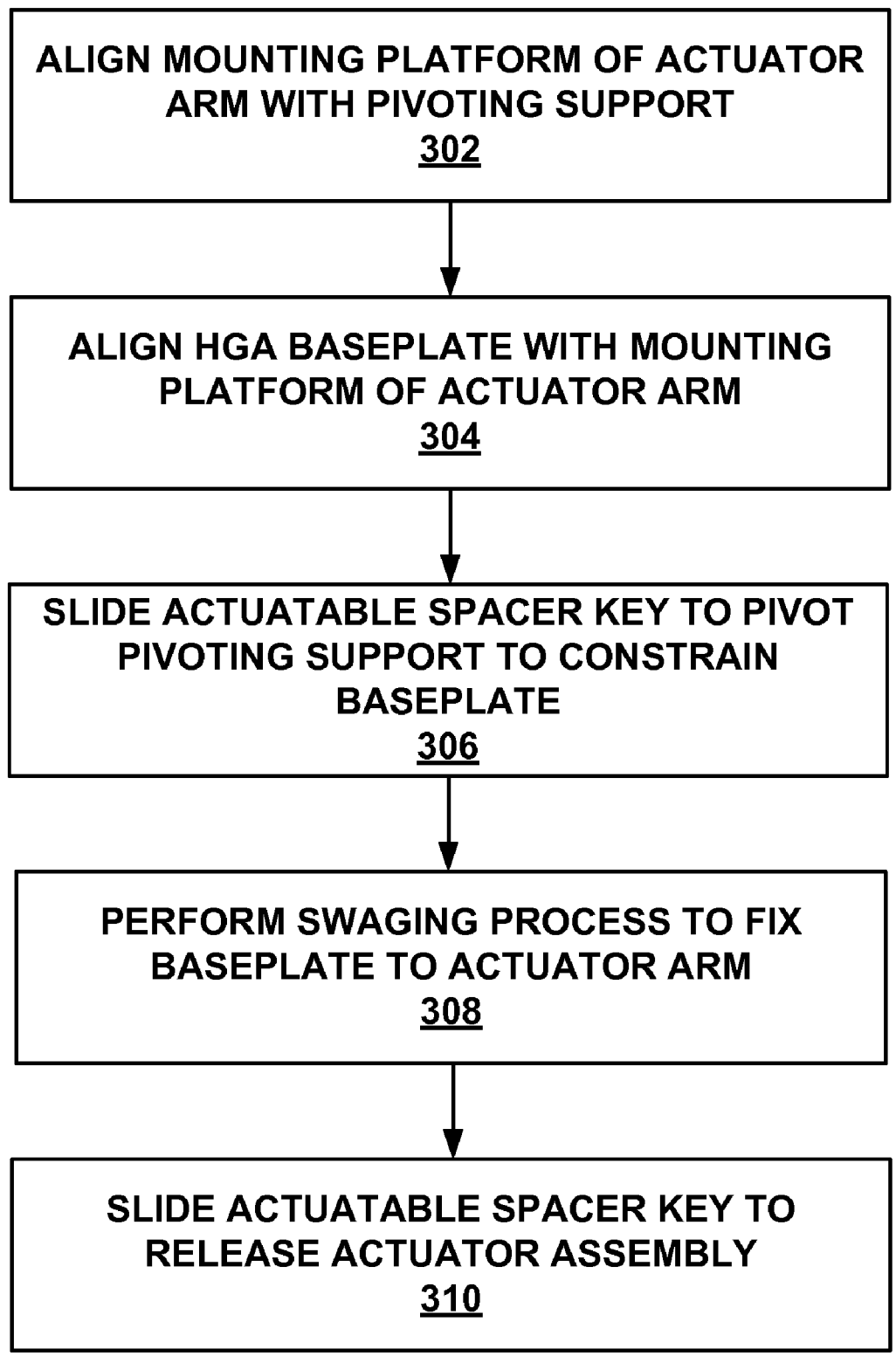
FIG. 8 is a flow chart illustrating techniques for attaching one or more head gimbal assembly (HGAs) to an actuator assembly.

FIG. 8 is a flow chart illustrating techniques for attaching one or more head gimbal assembly (HGAs) to an actuator assembly. For illustrative purposes, the techniques shown in FIG. 8 are described with respect to HGA 100 (FIG. 1), actuator assembly 250 (FIG. 2) and spacer key assembly 200 (FIGS. 2-7).

First, mounting platforms 254 of actuator assembly 250 are aligned with pivoting supports 230 in spacer key assembly 200 (302). In some embodiments, an actuator assembly may include only as few as a single mounting platform, and a spacer key assembly may include as few as a single pivoting support.

In the next step, multiple HGAs 100 are placed adjacent to pivoting supports 230 within gaps 290 in alignment with mounting platforms 254 of actuator assembly 250 (304). An HGA 100 is in alignment with one of mounting platforms 254 when boss hole 110 is aligned with a mounting hole 256. For actuator assembly 250, eight HGAs are placed in alignment with mounting platforms 254—one HGA for each mounting surface on actuator assembly 250 except for outer mounting surfaces 255.

Next, pivoting supports 230 are pivoted to constrain the baseplates 108 of the HGAs 100 tightly against the mounting platforms 254 of actuator arms 252. Using the example of spacer key assembly 200, spacer key assembly 200 includes body portion 202, which forms slots 235 containing actuatable spacer keys 212 in contact with pivoting supports 230. Pivoting supports 230 are pivoted by sliding actuatable spacer keys 212 such that distal ends of the actuatable spacer keys 212—wedge 270—interact with pivoting supports 230 (306). Outer keys 210 may also actuated as necessary. Outer keys 210 and actuatable spacer keys 212 may be manually operated or actuated by other means. Actuatable spacer keys 212 can be individually operated incrementally. For example, two baseplates 108 adjacent to the pivoting supports 230 associated with a single actuatable spacer key 212 may be aligned with the adjacent mounting platforms 254 and then a single actuatable spacer key 212 may be actuated to secure the aligned baseplates 108 against the adjacent mounting platforms 254. This technique may be repeated for each actuatable spacer key 212.

Once the baseplates 108 are constrained tightly against mounting platforms 254, a swaging process is performed to attach the HGAs 100 to the actuator assembly 250 (308). For example, the swaging process may include forcing a rounded object, such as a ball or needle, through the boss holes 110 to expand the material forming angled surface 110a against the interior surface of the corresponding mounting holes 256 on mounting platforms 254 to securely attach the HGAs 100 to actuator assembly 250. In some embodiments all HGAs 100 may be secured to actuator assembly 250 using a common swaging operation. In other embodiments, swaging operations may be performed incrementally as baseplates 108 are incrementally aligned and secured to mounting platforms 254 in steps 304 and 306.

After the swaging process is performed, pivoting supports 230 are pivoted to their open positions to release actuator assembly 250 from spacer key assembly 200. Using the example of spacer key assembly 200, actuatable spacer keys 212 are retracted to release actuator assembly 250 from spacer key assembly 200 (310).

Using Equation 1, a total of eight HGAs 100 are attached to the five mounting platforms 240 of actuator assembly 250. In other embodiments, every mounting platform in an actuator assembly may be used to support a total of either one or two HGAs and/or mass dampers. Actuator assembly 250, including eight attached HGAs 100, may then be installed in a disc drive.

Figure 9:
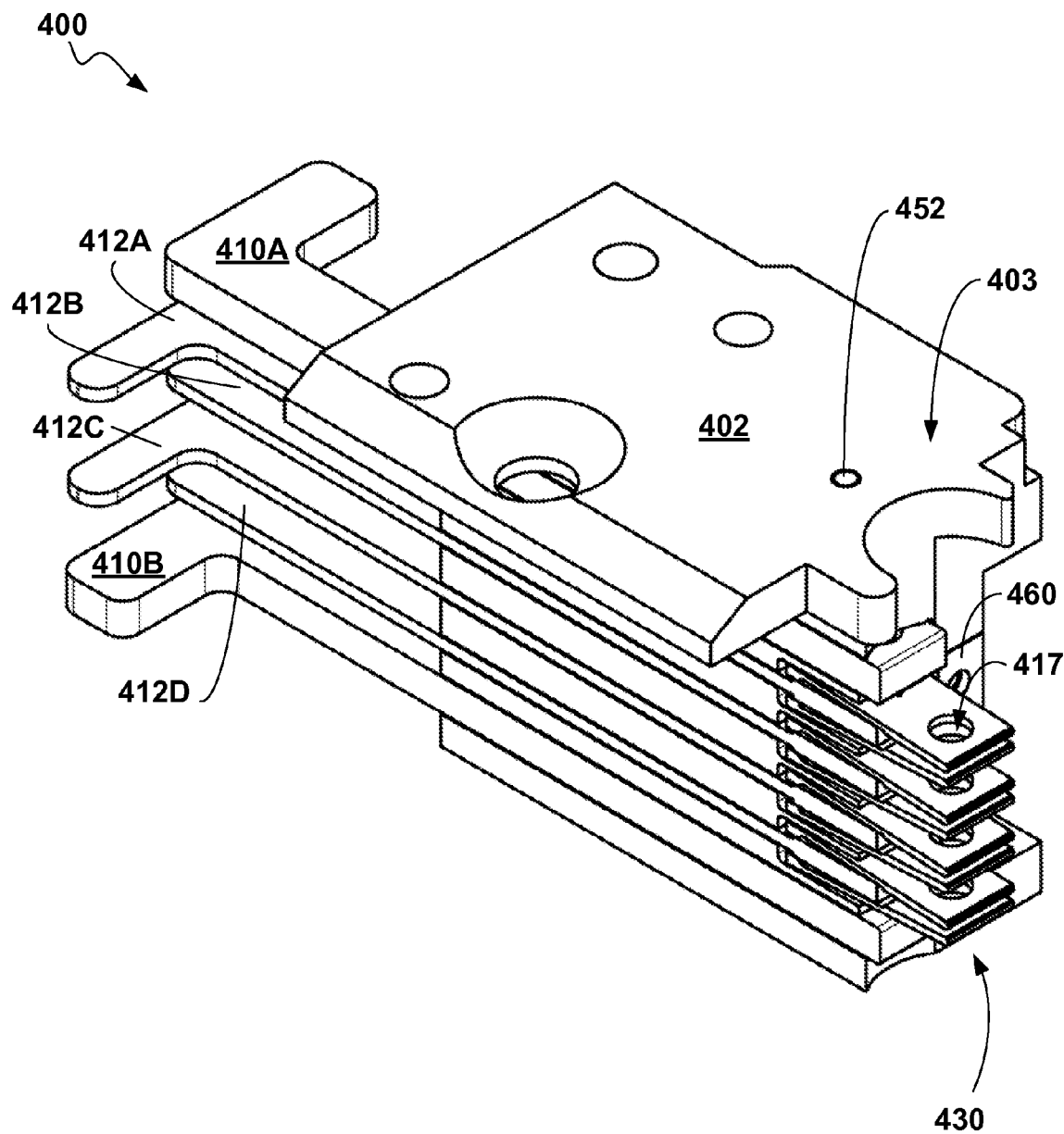
FIG. 9 illustrates a spacer key assembly including spacer keys with pivoting supports.

FIG. 9 illustrates spacer key assembly 400, which is an alternative to spacer key assembly 200 (FIG. 2). FIGS. 10-13 illustrate the components of spacer key assembly 400. Like spacer key assembly 200, spacer key assembly 400 is operable to constrain baseplates of HGAs against actuator arm mounting platforms with enough force to maintain alignment between an HGA and a mounting platform during a swaging process. Spacer key assembly 400 operates in a similar manner to spacer key assembly 200. For brevity, many details regarding spacer key assembly 400 that are the same or similar to details described with respect to spacer key assembly 200 are not described with respect to spacer key assembly 400.

Spacer key assembly 400 includes spacer keys 412A-412D (spacer keys 412). Each of spacer keys 412 is operable to actuate two pivoting supports 430 in order to constrain a baseplate of an HGA, e.g., HGA 100 (FIG. 1), tightly against mounting platforms of an actuator arm, e.g., to facilitate a swaging process. Spacer key assembly 400 also includes outer keys 410A and 410B (outer keys 410), which are not associated with pivoting supports.

Each of actuatable spacer keys 412 functions in a substantially similar manner. Sliding an actuatable spacer key 412 towards the corresponding pivoting supports 430 causes the distal end of the actuatable spacer key 412, thick end 470 (FIG. 13), to act on the two corresponding pivoting supports 430 to move the pivoting supports 430 to their closed positions. Conversely, sliding the actuatable spacer key 412 away from the corresponding pivoting supports 430 causes the distal end of the actuatable spacer key 412, thick end 470, to act on the pivoting supports 430 to move the pivoting supports 430 to their open positions, as shown in FIG. 9. Spacer key assembly 400 also includes biasing element 460, which has flexible fingers 467 that press on pivoting supports 430 to ensure that pivoting supports 430 move to their open positions when the associated actuatable spacer key 412 is actuated.

Figure 10:
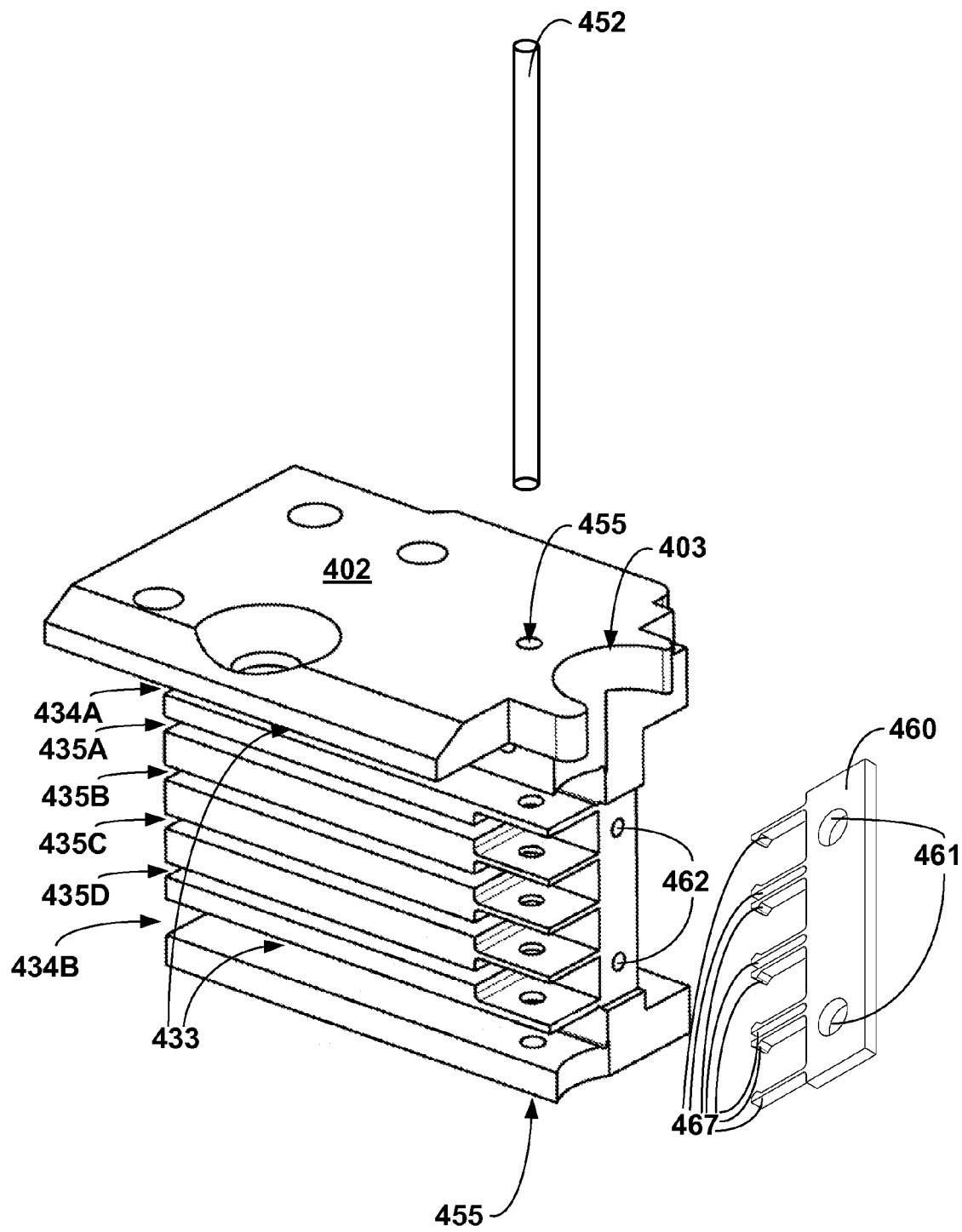
FIGS. 10-13 illustrate components of the spacer key assembly of FIG. 9.
Figure 12:
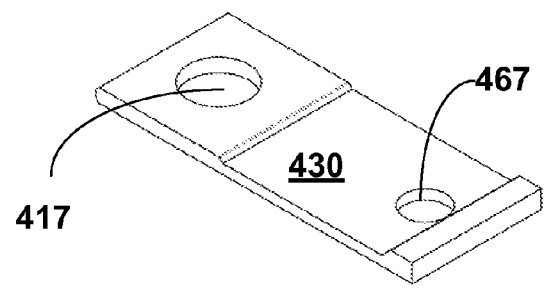
Figure 13:
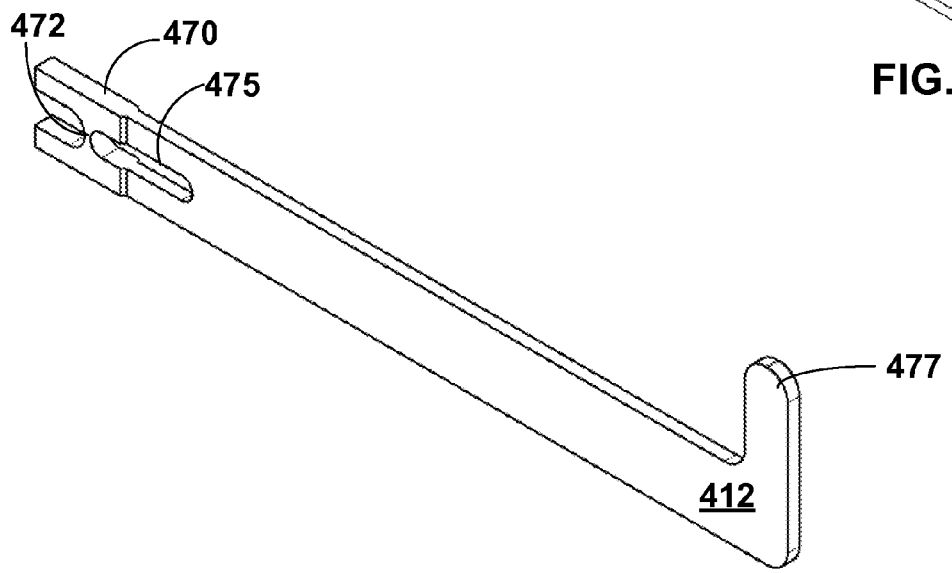

FIG. 10 illustrates body portion 402, which includes interior slots 435A-435D (interior slots 435) that hold actuatable spacer keys 412 (FIG. 13). Each of interior slots 435 also holds two of pivoting supports 430 (FIG. 12). Body portion 402 also includes outer slots 434A-434B (outer slots 434) for outer keys 410. Outer keys 410 function to brace unpopulated sides of actuator arms. Body portion 402 also includes guide 403, which allows a swaging device to access HGA baseplates constrained to mounting platforms of actuator arms in spacer key assembly 400.

FIG. 10 also illustrates biasing element 460 and pin 452 adjacent to body portion 402. Biasing element 460 includes holes 461 that align with threaded holes 462 and is attached to body portion 402 with screws. Biasing element 460 includes flexible fingers 467 that press on pivoting supports 430 to bias pivoting supports 430 to their open positions. The forces applied by flexible fingers 467 on pivoting supports 430 are overcome by actuatable spacer keys 412 to move pivoting supports 430 to their closed positions.

FIG. 10 also illustrates pin 452 adjacent to body portion 402. Pin 452 is inserted in hole 455 of body portion 402. In spacer key assembly 400, pin 452 limits the range of motion of outer keys 410 by passing through slots 415 in each of outer keys 410, actuatable spacer keys 412 by passing through slots 475 in each of actuatable spacer keys 412 and pivoting supports 430 by passing through holes 467 in each of pivoting supports 430.

Figure 11:
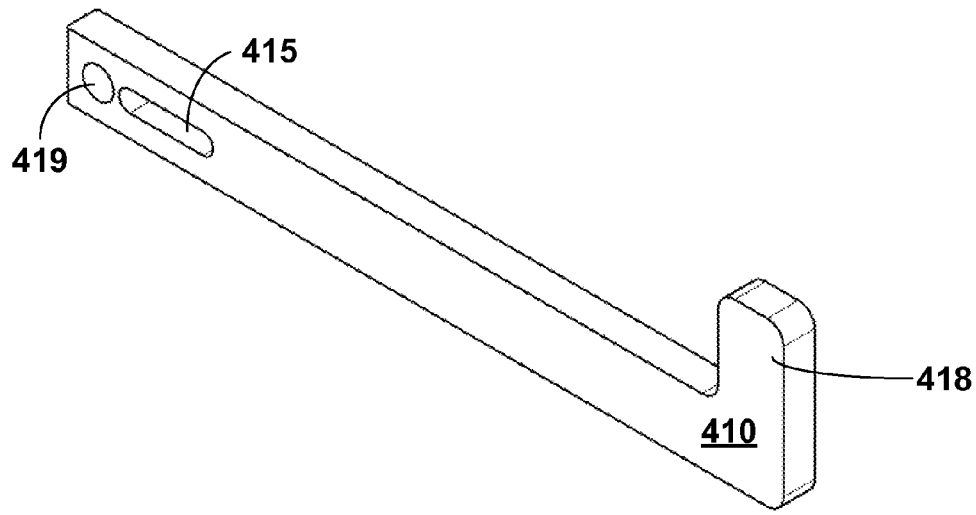

FIG. 11 illustrates one of outer keys 410. Outer keys 410 are slidable within outer slots 434 in body portion 402 (FIG. 10). An outer key 410 includes grip 418, which provides a larger area for manual actuation of the outer key 410. Slot 415 interacts with pin 452 to limit the motion of outer key 410 within an outer slot 234.

FIG. 12 illustrates one of pivoting supports 430. As shown in FIG. 9, two of pivoting supports 430 fit at least partially within each of interior slots 435. Pivoting supports 430 are acted on by actuatable spacer keys 412 to move between closed and open positions. In addition, a finger 467 of biasing element 460 applies a force to each pivoting support 430 to bias the pivoting support to an open position. In an open position, a pivoting support 430 is adjacent to a gap large enough to receive both a mounting platform of an actuator arm and a baseplate of the HGA positioned in alignment with the mounting platform of the actuator arm. The gap may be formed between two of pivoting supports 430 or between a pivoting support 430 and an outer key 410. In a closed position, a pivoting supports 430 constrains the baseplate of an HGA tightly against a mounting platform of an actuator arm because the width of the gap is reduced.

FIG. 13 illustrates one of actuatable spacer keys 412. Actuatable spacer keys 412 are slidable within interior slots 435 in body portion 402 (FIG. 10). An actuatable spacer key 412 includes grip 477, which provides a larger area for manual actuation of the actuatable spacer key 412. The distal end of an actuatable spacer key 412 forms a thick end 470, which contacts two pivoting supports 430 to pivot the two pivoting supports 430 between open and closed positions as the actuatable spacer key 412 slides from a fully retracted position to a fully extended position. U-shaped cutout 272 in thick end 470 is configured to allow access to a mounting platform of an actuator arm and a baseplate of the HGA positioned in alignment with the mounting platform of the actuator arm when held by spacer key assembly 400 for a swaging process. The motion of an actuatable spacer key 412 is limited by pin 452, which fits in slot 475.

With reference to FIG. 9, spacer key assembly 400 also includes a cover (not shown). To assemble spacer key assembly 400, the movable components of spacer key assembly 400 (outer keys 410, actuatable spacer keys 412 and pivoting supports 430) are first properly positioned in body portion 402. Then pin is inserted in hole 455 of body portion 402, through slots 415 in each of outer keys 410, through slots 475 in each of actuatable spacer keys 412 and through holes 467 in each of pivoting supports 430. Then, a cover is attached to body portion 402 to hold the movable components in place. For example, the cover may be attached to body portion 402 with screws or by other means. Last biasing element 460 is attached to body portion 402 such that fingers 467 contact each of pivoting supports 430. In some embodiments, the cover may be readily removable, e.g., to allow maintenance or replacement a damaged component of spacer key assembly 400.

Differences between spacer key assembly 400 and spacer key assembly 200 include the addition of pin 452 and biasing element 460. Furthermore, actuatable spacer keys 412 and pivoting supports 430 do not include angled surfaces that need to be accurately located to provide proper operation of spacer key assembly 400. Body portion 402 does not include grooves to form pivots for pivoting supports 430 in interior slots 435. These differences between spacer key assembly 400 and spacer key assembly 200 may allow spacer key assembly 400 to be manufactured more easily than spacer key assembly 200.

Embodiments of the invention may provide one or more of the following advantages. For example, spacer key assemblies including spacer keys with pivoting supports limit abrasions on the HGA baseplates caused by spacer key-baseplate contact. Generally, spacer keys are made of a very hard metal, e.g., 400 series stainless steel, whereas HGA baseplates are made of a softer metal, e.g., 300 series stainless steel. The softer HGA baseplate metal is useful because it is malleability facilitates the swaging process. This difference in metal hardness can result in abrasions to HGA baseplates caused by spacer key-baseplate contact. However, the pivoting action of spacer keys with pivoting supports does not create significant abrasions on HGA baseplates.

In contrast, some spacer key assemblies include sliding wedge-shaped spacer keys. Sliding wedge-shaped spacer keys pinch a baseplate of an HGA against an actuator arm by sliding in a spacer key assembly to locate a thicker portion of the wedge-shaped spacer key adjacent the baseplate. The sliding action may cause significant abrasions to HGA baseplates. Reducing abrasions to HGA baseplates may be beneficial to reduce loose particles within assembled disc drives, which can increase the reliability of the disc drives.

Embodiments of the invention may also provide exceptionally robust spacer key assemblies as loose particles created by contact between baseplates and sliding spacer keys can "gum up" spacer key assemblies making it difficult to actuate the sliding space keys as necessary for the swaging process. Because the pivoting action of spacer keys with pivoting supports does not create loose particles from significant abrasions on HGA baseplates, periodic maintenance of spacer key assemblies is limited.

Furthermore, because the embodiments allow for a spacer key assembly to include only three unique movable parts (outer keys, actuatable spacer keys and pivoting mechanisms) manufacturing costs of spacer key assemblies are limited.

Various embodiments of the invention have been described. For example, the described embodiments have been generally directed to attaching HGAs to disc drive actuators. However, the invention may also be utilized in other ways, e.g., to attach heads to actuators for a servo track writer. These and other embodiments are within the scope of the following claims.

The invention claimed is:

1. An apparatus for attaching a boss surface of a head gimbal assembly (HGA) to a mounting feature of an actuator arm, the apparatus comprising:
    a first support including a first support surface defining a first aperture;
    a second, pivoting support including a second support surface that faces the first support surface and defining a second aperture, wherein the first support surface is operably separated from the second support surface by a gap; and
    a mechanism that selectively pivots the second support between an open position, whereat the gap is sized to clearingly receive the boss surface and the mounting feature in alignment with each other and in alignment with the first and second apertures, and a closed position, whereat the gap is reduced so that the first and second supports constrain the boss surface and the mounting feature in a mating engagement with each other while in the alignment with the first and second apertures.

2. The apparatus of claim 1 wherein the boss surface defines a boss hole and the mounting feature is characterized by a surface of the actuator arm defining a mounting hole, the first aperture and the second aperture sized larger than the mounting hole.

3. The apparatus of claim 2, wherein the first aperture and the second aperture are sized so that the first support surface and the second support surface, respectively, clearingly disengage the mounting hole permitting a swaging process to affix the boss surface to the mounting feature.

4. The apparatus of claim 1, wherein the mechanism is characterized by a spacer key defining an angled distal end, the spacer key being selectively slidable between a retracted position whereat the angled distal end abuttingly disengages the pivoting support and thereby corresponding to the open position of the gap, and an engaged position whereat the angled distal end abuttingly engages the pivoting support and thereby corresponding to the closed position of the gap.

5. The apparatus of claim 4, wherein the angled distal end of the spacer key is wedge shaped.

6. The apparatus of claim 4, wherein the second support comprises a protuberant pivot member opposite to the second support surface around which the second support is operably pivoted in moving between the open position and the closed position.

7. The apparatus of claim 1 comprising two pairs of first and second support members, wherein the mechanism simultaneously selectively pivots both pairs between the open position and the closed position.

8. The apparatus of claim 1, wherein the first support is an actuatable outer key.

9. The apparatus of claim 1, wherein the first support is a pivoting support.

10. The apparatus of claim 9, wherein the mechanism simultaneously selectively pivots the first and second supports between the open position and the closed position.

11. The apparatus of claim 1, wherein the actuator arm is a disc drive actuator arm.

12. An apparatus for attaching an HGA to an actuator arm, the apparatus comprising:
    a body;
    first and second supports having opposing surfaces extending from the body and terminating at respective distal free ends, the opposing surfaces converging in relation to each other and in relation to advancing toward distal ends of the first and second supports to define an open mode whereat a gap adjacent the first and second supports is sized to clearingly receive one of the HGAs and one of the actuator arms in alignment with each other;
    a mechanism that selectively abuttingly engages the first and second supports to move the distal ends away from each other to a closed mode whereat the gap is reduced to constrain the HGA and the actuator arm in a mating engagement with each other.

13. The apparatus of claim 12, wherein the mechanism is characterized by a spacer key defining an angled distal end, the spacer key being selectively slidable in a slot formed by the body between a retracted position whereat the angled distal end abuttingly disengages the pivoting supports thereby corresponding to the open mode, and an engaged position whereat the angled distal end abuttingly engages the pivoting supports thereby corresponding to the closed mode.

14. The apparatus of claim 12, wherein the HGA defines a boss surface and the actuator arm defines a mounting hole sized to facilitate a swaging process to attach the HGA to the actuator arm.

15. The apparatus of claim 12, wherein the actuator arm is in a disc drive actuator assembly.

16. A method for attaching a head gimbal assembly (HGA) to an actuator arm comprising:
    obtaining an apparatus having a plurality of supports, a first support of the plurality including a first support surface defining a first aperture, a second support of the plurality including a second support surface that faces the first support surface and defining a second aperture, wherein the first support surface is operably separated from the second support surface by a gap, the apparatus further having a mechanism that selectively pivots the second support between an open position, whereat the gap is sized to clearingly receive the HGA and the actuator arm in alignment with each other and in alignment with the first and second apertures, and a closed position, whereat the gap is reduced so that the first and second supports constrain the HGA and the actuator arm in a mating engagement with each other while in the alignment with the first and second apertures;

actuating the mechanism in a first mode to move the plurality of supports to the open position;

aligning the HGA and the actuator arm with each other in the gap between the first and second supports; and actuating the mechanism in a second mode to move the plurality of supports to the closed position to constrain the HGA and the actuator arm together between the first and second supports.

* * * * *